(12) United States Patent
Fangmeier

(10) Patent No.: US 9,010,372 B2
(45) Date of Patent: Apr. 21, 2015

(54) CHANGEOVER VALVE

(75) Inventor: Martin Fangmeier, Auggen (DE)

(73) Assignee: Neoperl GmbH, Müllheim (DE)

( * ) Notice: Subject to any disclaimer, the term of this patent is extended or adjusted under 35 U.S.C. 154(b) by 109 days.

(21) Appl. No.: 13/979,252

(22) PCT Filed: May 30, 2012

(86) PCT No.: PCT/EP2012/002285
§ 371 (c)(1),
(2), (4) Date: Jul. 11, 2013

(87) PCT Pub. No.: WO2012/163523
PCT Pub. Date: Dec. 6, 2012

(65) Prior Publication Data
US 2013/0291975 A1 Nov. 7, 2013

(30) Foreign Application Priority Data

May 31, 2011 (DE) ...................... 20 2011 101 289 U

(51) Int. Cl.
*F16K 11/04* (2006.01)
*F16K 11/16* (2006.01)
(Continued)

(52) U.S. Cl.
CPC ........... *F16K 11/161* (2013.01); *F16K 11/0445* (2013.01); *F16K 11/048* (2013.01); *F16K 11/18* (2013.01)

(58) Field of Classification Search
CPC ...... F16K 11/04; F16K 11/044; F16K 11/048
USPC ...................... 137/625.48, 625.5, 862; 251/77
See application file for complete search history.

(56) References Cited

U.S. PATENT DOCUMENTS 245,662 A * 8/1881 Rinderknecht .......... 137/625.34
(Continued)

FOREIGN PATENT DOCUMENTS

| DE | 1253430 | 11/1967 |
|---|---|---|
| DE | 1750092 | 1/1971 |
| EP | 0701075 | 3/1996 |

*Primary Examiner* — John Fox
(74) *Attorney, Agent, or Firm* — Volpe and Koenig, P.C.

(57) ABSTRACT

A changeover valve (1) including a valve housing (2), which has at least one inlet opening (3) and at least three outlet openings (4, 5, 6), of which outlet openings (4, 5, 6), by a changeover shaft (7) displaceably guided in the valve housing (2), one outlet opening can optionally respectively be assigned to the at least one inlet opening (3), two sealing elements (8, 9), which (8, 9) are displaceably guided on the changeover shaft (7) between two drivers (10, 11) and are kept at a distance from each other with the aid of at least one pressure element (12), a switching tube (13), which is displaceably guided in the valve housing (2) via two circumferential annular guide surfaces (14, 15) provided on the tube circumference thereof, and at least one switching tube opening (16) provided between the annular guide surfaces (14, 15). An axial actuating movement of the changeover shaft (7) can be transferred at least to one of the two sealing elements (8, 9) in such a way that either both sealing elements (8, 9) bear with outer circumferential sealing surfaces (18, 19) on the sealing surfaces (22, 23) of the valve housing (2) that surround a fluid passage (20, 21) and one of the sealing elements (8, 9) closes the adjacent circumferential front edge of the switching tube (13) with an inner circumferential sealing surface (24, 25) while the other sealing element (9, 8) remains at a distance from the other circumferential front edge of the switching tube (13), serving as a fluid passage, or both inner circumferential sealing surfaces (24, 25) of the sealing elements (8, 9) bear on the adjacent circumferential front edges of the switching tube (13) while the one sealing element (8, 9) uses the outer circumferential sealing surface (18, 19) thereof to load the adjacent mating sealing surface (22, 23) surrounding the fluid passage, and the other sealing element (9, 8) is spaced apart from the mating sealing surface (25, 24) assigned thereto and surrounding a fluid passage (21, 20).

10 Claims, 4 Drawing Sheets

(51) Int. Cl.
    *F16K 11/044*   (2006.01)
    *F16K 11/048*   (2006.01)
    *F16K 11/18*    (2006.01)

(56)            References Cited

U.S. PATENT DOCUMENTS 2,441,201 A *  5/1948  Ludwig, Jr. .................. 137/106
    2,739,613 A *  3/1956  Kulikoff .................. 137/625.27
    2,837,114 A *  6/1958  Ruhl .......................... 137/596.2
    2,969,045 A    1/1961  Clar
    3,779,280 A    12/1973 Evans et al.
    3,974,861 A *  8/1976  Goto et al. ................ 137/627.5
    4,250,920 A *  2/1981  Traylor .................... 137/625.29
    4,319,607 A *  3/1982  Fields ........................ 137/625.5
    4,442,998 A *  4/1984  Ohyama et al. .......... 251/129.08
    5,275,207 A *  1/1994  Tonhauser et al. ............ 137/870
    6,234,202 B1 * 5/2001  Grill ........................ 137/596.17

* cited by examiner

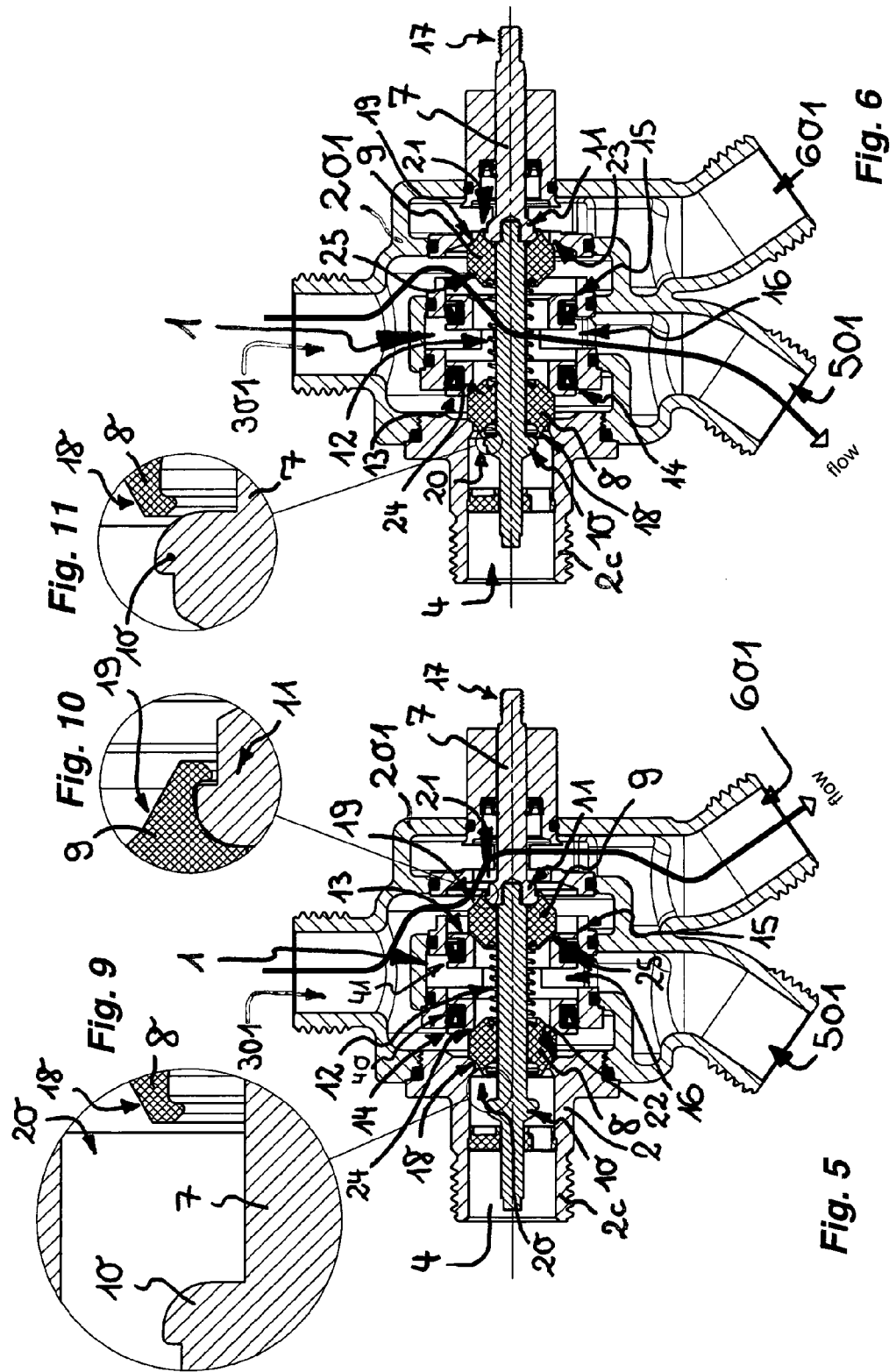

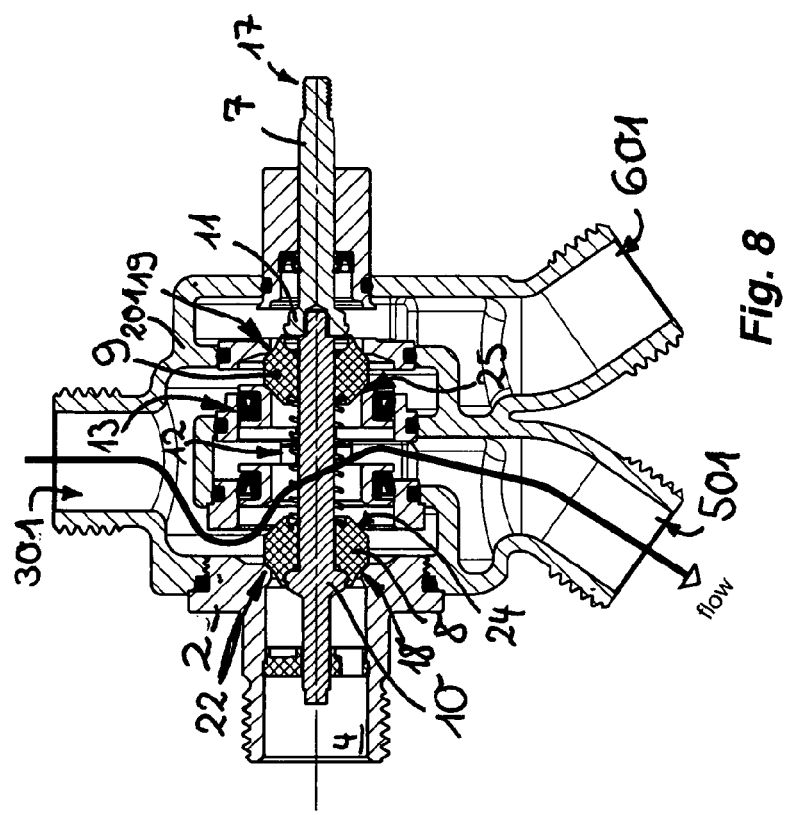
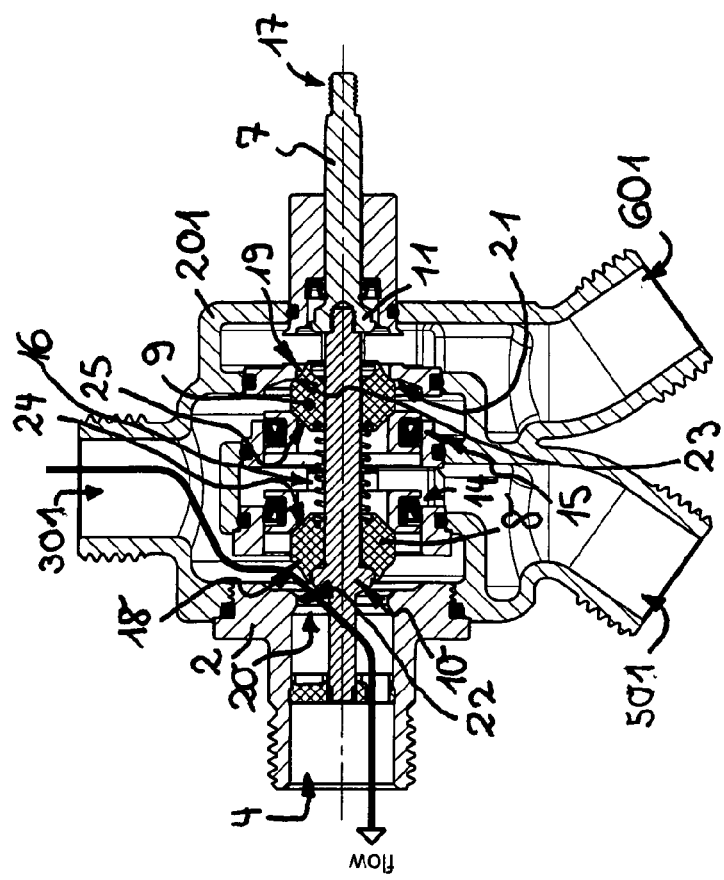
Fig. 7
Fig. 8

CHANGEOVER VALVE

BACKGROUND

The invention relates to a changeover valve by means of which different outlets of the changeover valve can be selectively assigned to the inlet of said changeover valve.

Inter alia in sanitary applications, changeover valves are already known in various embodiments for the purpose of conducting water extracted from the mains network selectively either to a bathtub outlet or to a shower head. Also already in existence are changeover valves configured as 4/3 directional valves which have three outlets, of which a first outlet is connected to a handheld shower and a second outlet is connected to a fixed shower head, while a third outlet can be connected to a bathtub faucet.

In the case of the already known 4/3 directional valves, one of the three outlets can normally be activated by means of a rotational or translatory changeover movement. If it is the intention for one outlet to have priority in certain operating states, this is realized, in the general fields of engineering, by hydraulic, pneumatic or electromechanical actuators. In the sanitary field, however, since the functions "self-retaining" and "primary position" are normally used and hydraulic, pneumatic or electromechanical actuators are rather unusual, use is made here of simple pull or push changeover means which have only two pre-selectable outlets. If, by contrast, and in a manner exceptional in the sanitary field, three outlets are required, use is normally made of rotationally operated changeover means which generally do not exhibit automatic return into a primary position.

SUMMARY

It is therefore the object in particular to provide a hand-actuable changeover valve which, over and above a primary position, can be switched over to two further fluid paths, wherein even in the case of a relatively low operating pressure, self-retention in the preselected fluid path is realized, and an automatic return into the primary position should always be ensured after the throughflow is shut off.

This object is achieved according to the invention by means of the features of the present invention.

The changeover valve according to the invention has a valve housing which has one inlet and three outlets and which is thus configured as a 4/3 directional valve. To direct the fluid path in the changeover valve to one of the outlets, the respectively selected outlet can be assigned to the one inlet by means of a changeover shaft guided displaceably in the valve housing. For this purpose, two sealing elements are guided displaceably on the changeover shaft between two drivers and are held spaced apart from one another by means of at least one thrust element.

The changeover valve according to the invention has a switching tube which is guided displaceably in the valve housing by means of two encircling guide ring surfaces provided on the tube circumference thereof and which has at least one switching tube orifice provided between the guide ring surfaces. On both sides of said at least one radially arranged switching tube orifice there may be arranged annular seals which are preferably provided in the region of the guide ring surfaces or form said guide ring surfaces. Beyond the at least one radially arranged switching tube orifice, the switching tube has circumferential face edges arranged axially on both sides, said circumferential face edges border the open face sides of the switching tube. In the case of the changeover valve according to the invention, an axial setting movement of the changeover shaft can be transmitted to at least one of the two sealing elements such that either both sealing elements bear with outer encircling sealing surfaces against counterpart sealing surfaces, which border a fluid passage, of the valve housing and one of the sealing elements, by means of an inner encircling sealing surface, closes off the adjacent circumferential face edge of the switching tube while the other sealing element remains spaced apart from the other circumferential face edge, which serves as a fluid passage, of the switching tube, or else both inner encircling sealing surfaces of the sealing elements bear against the adjacent circumferential edges of the switching tube while one sealing element, by means of its outer encircling sealing surface, acts on the adjacent counterpart sealing surface which borders the one fluid passage and the other sealing element is spaced apart from the counterpart sealing surface which is assigned thereto and which borders a fluid passage.

If the encircling sealing surfaces provided at the inside on the sealing elements bear against the adjacent circumferential edges of the switching tube, while at the same time one sealing element, by means of its outer encircling sealing surface, acts on the adjacent counterpart sealing surface which borders the one fluid passage and the other sealing element is spaced apart from the counterpart sealing surface which is assigned thereto and which borders a fluid passage, the fluid can be conducted past the switching tube to the right or to the left, through the annular gap remaining between said switching tube and the valve housing, to one of the outlets. Here, the thrust element provided between the sealing elements is compressed in such a way that only one sealing element acts, by means of its outer encircling sealing surface, on the adjacent counterpart sealing surface which borders the one fluid passage, while the other sealing element is spaced apart from the counterpart sealing surface which is assigned thereto and which borders a fluid passage. As a result of the internal pressure of the fluid flowing through the housing via said flow path, the above-mentioned sealing element is pressed against the thrust element, which thereby remains, in the sense of self-retention, in the compressed state. If the supply of the fluid is interrupted and an atmospheric internal pressure prevails again in the housing interior of the fluid housing, the thrust element can move back into its initial position and displace the one sealing element on the changeover shaft automatically in the direction of the associated fluid passage such that said sealing element exposes the circumferential face edge of the switching tube and bears, by means of its outer sealing edge, against the counterpart sealing surface which borders the fluid passage.

In this way, in said primary position, a flow path is now activated which leads through the circumferential face edge, which is exposed in the relaxed state of the thrust element, of the switching tube and through the at least one switching tube orifice to another outlet. The changeover valve according to the invention, which may also be hand-actuable, can thus be switched, over and above a primary position, to two further fluid paths, wherein even in the case of a relatively low operating pressure, self-retention in the preselected fluid path is realized, and an automatic return into the primary position is always ensured after the throughflow is shut off.

To be able to arrange the various inlets and outlets on the outside of the valve housing, it is advantageous for a first outlet orifice to be positioned upstream with respect to the direction of the flow path leading thereto, and for the other orifices to be provided on the housing circumference of the valve housing.

One preferred refinement of the invention provides that the second axial fluid passage is positioned upstream of an outlet orifice, which is provided on the housing circumference and which is situated in a plane arranged transversely with respect to the changeover shaft, with respect to the direction of the flow path leading thereto.

One preferred embodiment of the invention provides that the at least one switching tube orifice of the switching tube is positioned upstream of a third outlet orifice with respect to the direction of the flow path leading thereto.

To be able to manually actuate the changeover valve according to the invention in as simple a manner as possible, it is expedient for at least one shaft end of the changeover shaft to project outward through a housing passage and to be designed as a handle intended preferably for manual actuation.

While the sealing elements should be guided displaceably on the changeover shaft with low friction, the drivers may, by contrast, be held on the changeover shaft in a frictionally locking manner. An embodiment is however preferable in which at least one driver is connected, immovably at least in the axial direction, to the changeover shaft.

To make it possible for the changeover valve to be easily manually switched from one flow path to the other flow path even while a fluid flow is passing through, it is advantageous if at least one sealing element can be detachably connected to the adjacent driver.

Here, one preferred refinement of the invention provides that at least one sealing element has, on its face side facing toward the adjacent driver, a receptacle for a suction-cup-like connection and/or mechanical latching at least to an adjacent subregion of the driver.

A particularly simple embodiment, which is easy to produce and which also simplifies the design outlay for the switchover valve according to the invention, provides that the at least one thrust element is designed as a spring coil which extends in a displaceable manner around the changeover shaft.

In order to facilitate the automatic return of the changeover valve according to the invention into a primary position after the shut-off of an upstream shut-off valve, it is advantageously the case that, when atmospheric internal pressure prevails in the valve housing, the at least one thrust element moves a sealing element from a setting position, in which it bears against the circumferential face edge of the switching tube, into an initial position, in which it bears against the adjacent axial fluid passage, in such a way that, during the subsequent extraction process, the fluid can flow into the switching tube through the thereby exposed face orifice of the switching tube, and from there, can flow out of said switching tube through the at least one radial switching tube orifice of said switching tube.

BRIEF DESCRIPTION OF THE DRAWINGS

Refinements of the invention will emerge from the claims in conjunction with the description and the figures. The invention will be explained in more detail below on the basis of a preferred exemplary embodiment.

In the figures:

FIG. 5 shows the changeover valve from FIGS. 1 to 4 in a longitudinal section, the changeover valve being shown here in the case of a first flow path and mounted in a fitting housing, FIG. 6 shows the changeover valve from FIGS. 1 to 5 in a longitudinal section, the changeover valve automatically returning, after the shut-off of the fluid throughflow, into a third flow path defined as the primary position, FIG. 7 shows the changeover valve from FIGS. 1 to 6 in a longitudinal section, the changeover valve being shown in the case of a second flow path, FIG. 8 shows the changeover valve from FIGS. 1 to 7 in a longitudinal section, the changeover valve automatically returning again, after the shut-off of the fluid throughflow, into a fourth flow path corresponding to the primary position, FIG. 9 shows the changeover valve from FIGS. 1 to 8 in a detail longitudinal section in the region of a sealing element guided on the changeover shaft as far as a driver, FIG. 10 shows the changeover valve from FIGS. 1 to 9 in a detail longitudinal section in the region of the sealing element connected to the associated driver, and FIG. 11 shows the changeover valve from FIGS. 1 to 10 in a detail longitudinal section in the region of the sealing element moved into the vicinity of the associated driver.

DETAILED DESCRIPTION OF THE PREFERRED EMBODIMENTS

Figure 1:
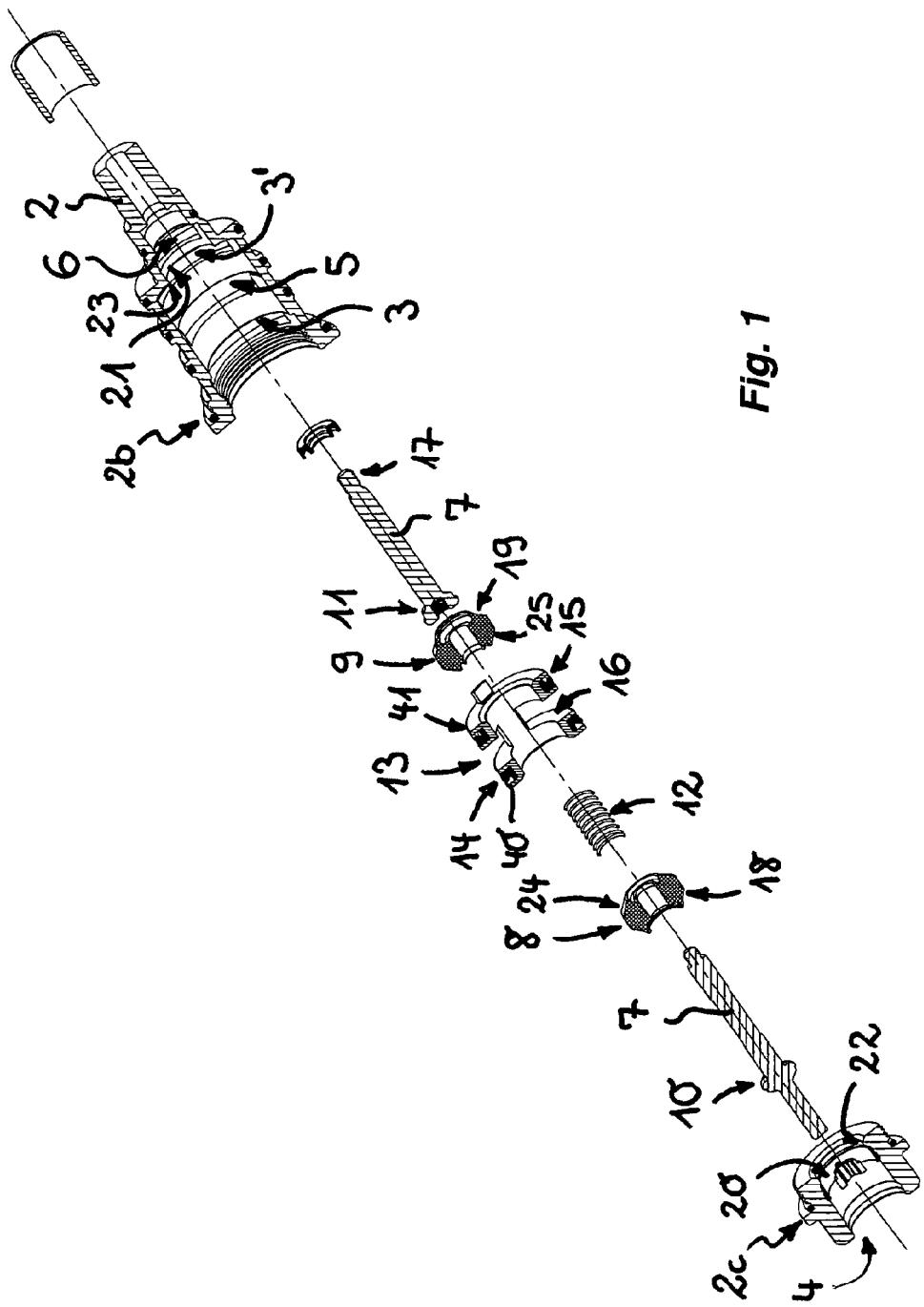
FIG. 1 shows a changeover valve configured as a 4/3 directional valve, in which the flow path from an inlet to one of three outlets can be selected by means of a changeover shaft which is guided displaceably in a valve housing, in an exploded illustration of its individual parts.
Figure 4:
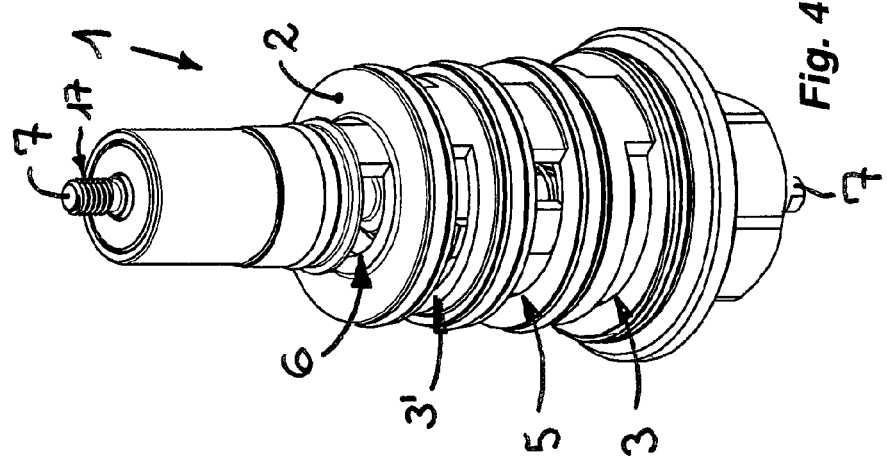
FIG. 4 shows the changeover valve from FIGS. 1 to 3 in a perspective side view.
Figure 3:
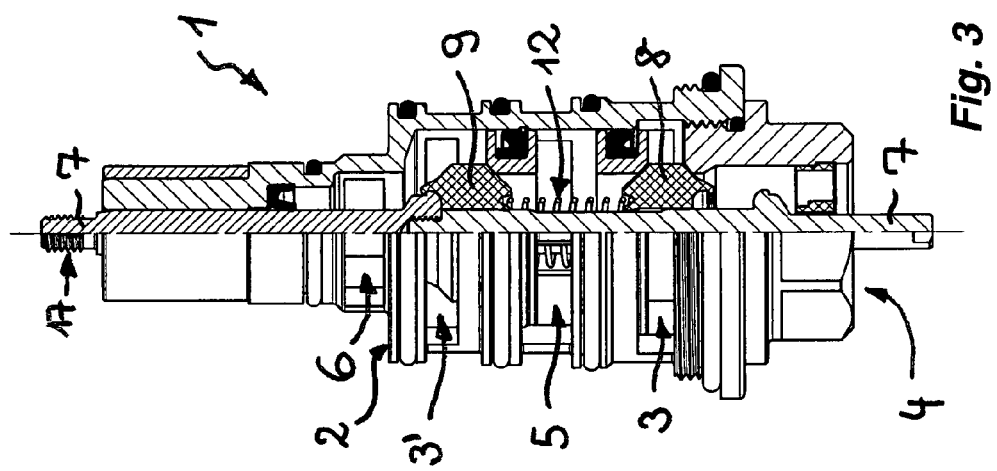
FIG. 3 shows the changeover valve from FIGS. 1 and 2 in a side view partially in section in the longitudinal direction.
Figure 2:
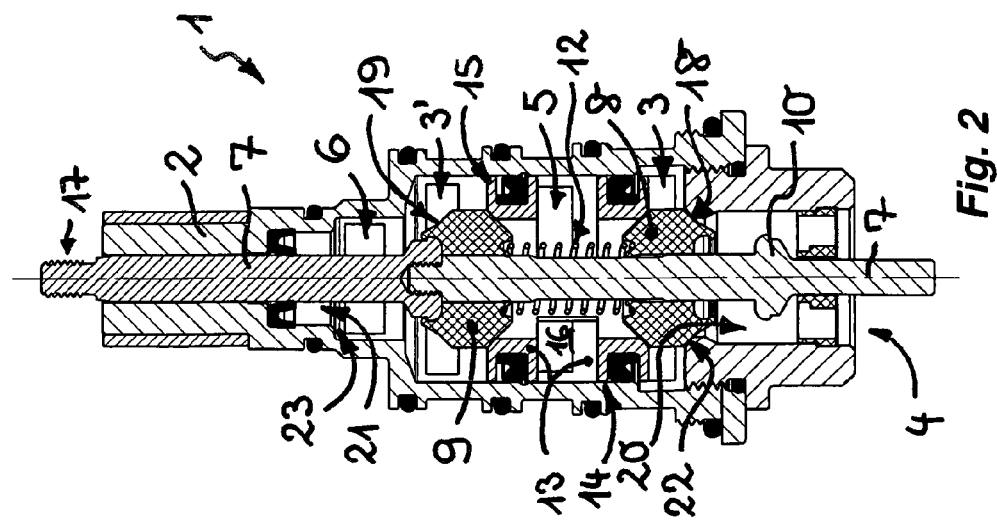
FIG. 2 shows the changeover valve from FIG. 1 in a longitudinal section.

FIGS. 1 to 11 show a changeover valve 1 configured as a 4/3 directional valve. While the inlet of the changeover valve 1 is connected for example to a water supply, the outlets of the changeover valve 1 lead selectively either to a bathtub outlet fitting, to a flexible handheld shower or else, for example, to a fixed shower head.

The changeover valve 1 has a valve housing 2 (not illustrated in any more detail in FIGS. 1 to 4) which has two inlet orifices 3, 3', which serve as an inlet, and three outlet orifices 4, 5 and 6, which serve as outlets. The valve housing 2 may be of single-part or multi-part form; here, the valve housing 2 is formed in two parts and has an insert cartridge 2b, which can be inserted into a fitting housing 201 (cf. FIGS. 5 to 8), and a threaded connection piece 2c, which serves as a face-side closure of the fitting housing 201 (cf. FIGS. 1 to 4). Of the three outlet orifices 4, 5, 6, in each case one outlet orifice can be selectively assigned, by means of a changeover shaft 7 guided displaceably in the valve housing 2, to the inlet orifices 3, 3'. Two sealing elements 8, 9 are guided displaceably on the changeover shaft 7 between two drivers 10, 11 and are held spaced apart from one another by means of at least one thrust element 12. In the valve housing 2 there is provided a switching tube 13 which is guided displaceably in the valve housing 2 by means of two encircling guide ring surfaces 14, 15 provided on the tube circumference thereof and which has at least one switching tube orifice 16 arranged between the guide ring surfaces 14, 15. On both sides of said at least one radially arranged switching tube orifice 16 there are provided annular seals which are formed in this case as lip seals 40, 41.

In order to enable the flow path in the changeover valve 1 to be manually adjusted and oriented to one of the outlets, one shaft end of the changeover shaft 7 projects outward through a housing passage and is formed there with an external thread 17 for a handle, designed for example as an actuating knob, to be screwed on.

An axial setting movement of the changeover shaft 7 can be transmitted to at least one of the two sealing elements 8, 9 such that either both sealing elements 8, 9 bear with outer encircling sealing surfaces 18, 19 against counterpart sealing surfaces 22, 23, which border a fluid passage 20, 21, of the valve housing 2 and one of the sealing elements 8, 9, by means of an inner encircling sealing surface 24 or 25, closes off the adjacent circumferential face edge of the switching tube 13 while the other sealing element 9, 8 remains spaced apart from the other circumferential face edge, which serves as a fluid passage, of the switching tube 13 (cf. FIGS. 6, 8), or else both inner encircling sealing surfaces 24, 25 of the sealing elements 8, 9 bear against the adjacent circumferential edges of the switching tube 13 while one sealing element 8 or 9, by means of its outer circumferential sealing surface 18 or 19, acts on the adjacent counterpart sealing surface 22 or 23 respectively which borders the one fluid passage 20 or 21 and the other sealing element 9 or 8 is spaced apart from the counterpart sealing surface 23 or 22 respectively which is assigned thereto and which borders a fluid passage 21 or 20 (cf. FIGS. 5, 7).

To orient the fluid path in the changeover valve 1 to one of the outlet orifices 4, 5, 6, the respectively selected outlet orifice can be assigned to the inlet orifices 3, 3' by means of the changeover shaft 7 which is guided displaceably in the valve housing 2. The sealing elements 8, 9 are guided displaceably on the changeover shaft 7 between the drivers 10, 11 and are held spaced apart from one another by means of the thrust element 12 which is designed here as a helical compression spring. The switching tube 13 is guided displaceably in the valve housing 2 of the changeover valve 1 by means of two encircling guide ring surfaces 14, 15 provided on the tube circumference thereof. The switching tube 13 has the at least one switching tube orifice 16 arranged between the guide ring surfaces 14, 15.

If the encircling sealing surfaces 24, 25 provided at the inside on the sealing elements 8, 9 bear against the adjacent circumferential edges of the switching tube 13 (cf. FIGS. 5, 7), while at the same time one sealing element 8 or 9, by means of its outer encircling sealing surface 18 or 19, acts on the adjacent counterpart sealing surface 22 or 23 respectively which borders the one fluid passage 20 or 21 and the other sealing element 9 or 8 is spaced apart from the counterpart sealing surface 23 or 22 respectively which is assigned thereto and which borders a fluid passage 21 or 20, the fluid can be conducted past the switching tube 13 to the right or to the left, through the annular gap remaining between said switching tube and the valve housing 2, to one of the outlet orifices 4 or 6. Here, the thrust element 12 provided between the sealing elements 8, 9 is compressed in such a way that only one sealing element 8, 9 acts, by means of its outer encircling sealing surface 18, 19, against the adjacent counterpart sealing surface 22 or 23 which borders the one fluid passage 20 or 21, while the other sealing element 9, 8 is spaced apart from the counterpart sealing surface 23, 22 which is assigned thereto and which borders a fluid passage 20, 21 (cf. FIGS. 5, 7). As a result of the internal pressure of the fluid flowing through the valve housing 2 via said flow path, the above-mentioned sealing element 8 or 9 is pressed against the thrust element 12, which thereby remains, in the sense of self-retention, in the compressed state. If the supply of the fluid is interrupted and an atmospheric internal pressure prevails again in the housing interior of the fluid housing 2, the thrust element 12 can move back into its initial position and displace the one sealing element 8, 9 on the changeover shaft 7 automatically in the direction of the associated fluid passage 20 or 21 such that said sealing element 8, 9 exposes the circumferential face edge of the switching tube 13 and bears, by means of its outer sealing edge 18, 19, against the counterpart sealing surface 22 or 23 which borders the fluid passage 20 or 21 (cf. FIG. 6, 8). In this way, in said primary position, a flow path is now activated which leads through the circumferential face edge, which is exposed in the relaxed state of the thrust element 12, of the switching tube 13 and through the at least one switching tube orifice 16 to another outlet 5.

While the changeover valve 1 remains in the valve positions shown in FIGS. 5 and 7 by way of self-retention even in the case of a low operating pressure, a return into the primary position shown in FIGS. 6 and 8 is effected when the throughflow is shut off at a shut-off valve positioned upstream of the changeover valve 1. The changeover valve 1 illustrated here can preferably be used with a wall-mounted faucet to which two different showers can be connected. While, for example, the flow path shown in FIG. 7 may lead to a fixedly installed shower head, the outlet 6 activated in FIG. 5 may be connected via a flexible hose to a handheld shower. Here, the switchover movement is imparted manually by means of a translatory movement by virtue of the changeover shaft 7 being pushed and pulled out of the central position shown in FIGS. 5 and 7. If the throughflow of the fitting is shut off, the changeover valve 1 automatically returns into the primary positions shown in FIGS. 6 and 8. This automatic return function assists in preventing back-suction of potentially contaminated used water into the mains network via the handheld shower, and is standard in many parts of the world.

Up to a pressure of for example 2.5 bar upstream of the changeover valve 1, the latter can also be returned into the primary position shown in FIGS. 6 and 8 from the valve positions shown in FIG. 5 or 7 manually, without the upstream fitting valve having to be closed.

The sealing elements 8, 9, which in the valve housing 2 can close off the fluid passages 20, 21 bordered by the counterpart sealing surfaces 22, 23, are preferably designed to provide an axial sealing action and arranged in an axially movable manner on the changeover shaft 7.

The two sealing elements 8, 9 which are arranged in an axially movable manner on the changeover shaft 7, which are of low-friction design for this purpose, and which can close off the fluid passages on both face sides of the switching tube 13, are preferably designed to provide an axial sealing action. The central switching tube 13, which at its two face ends has in each case one central passage as a fluid passage and, in the center, the radially arranged switching tube orifice 16 for the egress of fluid, is movable axially between the two abovementioned sealing elements 8, 9 which seal off the fluid flow. During said axial movement, the switching tube orifice 16 which serves as a radial outlet is always connected in an overlapping manner to the likewise radially running outlet orifice 5 of the changeover valve 1.

The changeover shaft 7 guided axially displaceably in the valve housing 2 bears the drivers 10, 11 which are intended for displacing the sealing elements 8, 9. Said sealing elements 8, 9 are pushed apart by the resiliently elastic element formed in this case as a compression spring coil 12, whereby, when the throughflow is shut off, one of the fluid passages on the face side of the switching tube 13 is open, and the outlet orifice 5 is activated while the outlet orifices 4 and 6 are closed.

All of the sealing elements 8, 9 which sealingly separate the outlet orifices 4, 5 and 6 from one another are of low-friction design in order to facilitate manual actuation of the changeover valve 1. Here, it is indicated in FIGS. 9 to 11 that, by means of a suction-cup-like design of that face side of the sealing elements 8, 9 which is assigned to the drivers 10, 11, an axial movement of the sealing elements 8, 9 can take place even when there is a throughflow, and thus counter to the internal pressure which imparts a self-retention action. For this purpose, said drivers 10, 11 must exhibit radial sealing with the changeover shaft 7 or, as is the case here, preferably be integrally connected to said changeover shaft.

If the changeover shaft 7 is pushed, the driver 11 drives the associated sealing element 9 along and presses it sealingly against the adjacent axial fluid passage on the face side of the switching tube 13, which switching tube 13 is thereby in turn pressed sealingly, by way of the opposite axial fluid passage, against the sealing element 8, which sealing element 8 in turn seals off the outlet orifice 4 on its other face side (cf. FIG. 5). The flow path from the inlet orifice 3 to the outlet orifice 6 is thus the only possible passage for the fluid, whereas the outlet orifices 4 and 5 are held closed by the static internal pressure counter to the spring force of the thrust element 12.

If the throughflow is now shut off, atmospheric internal pressure prevails, and the thrust element 12 pushes the sealing element 9 axially back onto the fluid passage 21, whereby the adjacent face-side fluid passage of the switching tube 13 is opened in order that, upon the next shut-off of a throughflow, the fluid is assigned again to the outlet orifice 5 defined as the primary position (cf. FIG. 6).

If the changeover shaft 7 is pulled, the driver drives the associated sealing element 8 along and presses it sealingly against the associated adjacent fluid passage of the switching tube 13, which in turn, by way of the opposite axial fluid passage, seals against the inner sealing edge 25 of the sealing element 9, which in turn, by way of its outer sealing edge 19, seals off the fluid passage 21 of the valve housing 2 (cf. FIG. 7).

The outlet orifice 4 is thus the only possible passage for the fluid, whereas the outlet orifices 5 and 6 continue to be held closed counter to the spring force by the static internal pressure.

If the throughflow is now shut off again, atmospheric internal pressure prevails, and the thrust element 12 pushes the sealing element 8, which is assigned to the fluid passage 20, axially back in the direction of the outlet orifice 4, whereby the adjacent face-side fluid passage of the switching tube 13 is opened, and upon the next activation of a throughflow, the fluid can flow out again via the outlet orifice 5 (cf. FIG. 8).

If, in the case of a throughflow of fluid, the changeover shaft 7 is situated in the positions shown in FIGS. 5 and 7, the respective driver 10, 11 is detachably held, and preferably latched with a suction-cup-like effect, in the associated sealing element 8, 9. If the changeover shaft 7 is now actuated by hand into the positions shown in FIG. 6 or 8, said releasable and in particular suction-cup-like connection of the drivers 10, 11 to the sealing elements 8, 9 allows the internal pressure, which acts so as to provide self-retention, to be overcome, and the fluid can flow out of the outlet orifice 5 again. The releasable connection of the drivers 10, 11 and of the sealing elements 8, 9 may also be of mechanically latched, for example snap-action type, in which said function is performed not by means of a resiliently elastic material but rather by means of for example thermoplastic material, whereby the internal pressure to be overcome, which internal pressure acts so as to provide self-retention, can be increased. Since, however, the latching of the drivers 10, 11 into the sealing elements 8, 9 is hindered, it is necessary, for said function, to find a compromise between ease of latching and an internal pressure that can be overcome, at least if a simple type of construction is sought.

It is clear in FIGS. 5 to 8 that the changeover valve 1 can be inserted into and mounted in a fitting housing 201. For this purpose, the valve housing 2 can be inserted into an insertion orifice of the fitting housing 201, until an external thread provided in this case on the threaded connection piece 2c engages on an internal thread which is provided on the inner circumferential wall bordering the insertion orifice of the fitting housing 201. In the mounted state, the inlet orifices 3, 3' of the valve housing 2 are connected to the inlet 301 of the fitting housing 201, and the outlet orifices 5, 6 are connected to the associated outlets 501 and 601, while the outlet orifice 4 remains accessible from the outside.

The invention claimed is:

1. A changeover valve (1) comprising a valve housing (2) which has at least one inlet orifice (3, 3') and at least three outlet orifices (4, 5, 6), of which (4, 5, 6) in each case one of the outlet orifices can be selectively assigned to the at least one inlet orifice (3, 3') by a changeover shaft (7) guided displaceably in the valve housing (2), two sealing elements (8, 9) are guided displaceably on the changeover shaft (7) between two drivers (10, 11) and are held spaced apart from one another by at least one thrust element (12), a switching tube (13) guided displaceably in the valve housing (2) by two encircling guide ring surfaces (14, 15) provided on a tube circumference thereof and the switching tube has at least one radial switching tube orifice (16) provided between the guide ring surfaces (14, 15), an axial setting movement of the changeover shaft (7) is transmitted at least to one of the two sealing elements (8, 9) such that either both of the sealing elements (8, 9) bear with outer encircling sealing surfaces (18, 19) thereof against counterpart sealing surfaces (22, 23), which border a fluid passage (20, 21), of the valve housing (2) and one of the sealing elements (8, 9) includes an inner encircling sealing surface (24, 25) that closes off an adjacent circumferential face edge of the switching tube (13) while the other sealing element (9, 8) remains spaced apart from the other circumferential face edge, which serves as a fluid passage, of the switching tube (13), or both inner encircling sealing surfaces (24, 25) of the sealing elements (8, 9) bear against the adjacent circumferential edges of the switching tube (13) while one of the sealing element (8, 9), by said outer encircling sealing surface (18, 19) thereof, acts on an adjacent one of the counterpart sealing surfaces (22, 23) which borders the fluid passage and the other sealing element (9, 8) is spaced apart from the counterpart sealing surface (25, 24) which is assigned thereto and which borders the fluid passage (21, 20).

2. The changeover valve as claimed in claim 1, wherein a first axial fluid passage is positioned upstream of a first outlet orifice (4) with respect to a direction of a flow path leading thereto, and the other orifices (3, 5, 6) are provided on the housing circumference of the valve housing (2).

3. The changeover valve as claimed in claim 2, wherein the second axial fluid passage (21) is positioned upstream of one of the outlet orifices (6), which is provided on a housing circumference and which is situated in a plane arranged transversely with respect to the changeover shaft (7), with respect to a direction of the flow path leading thereto.

4. The changeover valve as claimed in claim 3, wherein the at least one switching tube orifice (16) of the switching tube (13) is positioned upstream of a one of the third outlet orifices (5) with respect to a direction of the flow path leading thereto.

5. The changeover valve as claimed in claim 1, wherein at least one shaft end of the changeover shaft (7) projects outward through a housing passage and is configured as a handle.

6. The changeover valve as claimed in claim 1, wherein at least one of the drivers (10, 11) is connected, immovably at least in an axial direction, to the changeover shaft (7).

7. The changeover valve as claimed in claim 1, wherein at least one of the sealing elements (8, 9) is detachably connected to the adjacent driver (10, 11).

8. The changeover valve as claimed in claim 7, wherein at least one of the sealing elements (8, 9) has, on a face side thereof facing toward the adjacent driver (10, 11), a receptacle for a suction-cup connection or mechanical latching at least to an adjacent subregion of the driver (10, 11).

9. The changeover valve as claimed in claim 1, wherein the at least one thrust element (12) is configured as a spring coil which extends in a displaceable manner around the changeover shaft (7).

10. The changeover valve as claimed in claim 1, wherein when atmospheric internal pressure prevails in the valve housing (2), the at least one thrust element (12) moves one of the sealing elements (8, 9) from a setting position, in which it bears against one of the circumferential face edges of the switching tube (13), into an initial position, in which the sealing element bears against the adjacent axial fluid passage (20, 21), in such a way that, during a subsequent extraction process, the fluid flows into the switching tube (13) through a thereby exposed face orifice of the switching tube, and from there, flows of said switching tube.

\* \* \* \* \*